US010514149B2

United States Patent
Speier

(10) Patent No.: US 10,514,149 B2
(45) Date of Patent: Dec. 24, 2019

(54) LUMINAIRE ASSEMBLY

(71) Applicant: Quarkstar LLC, Las Vegas, NV (US)

(72) Inventor: Ingo Speier, Saanichton (CA)

(73) Assignee: Quarkstar LLC, Las Vegas, NV (US)

( * ) Notice: Subject to any disclaimer, the term of this patent is extended or adjusted under 35 U.S.C. 154(b) by 262 days.

(21) Appl. No.: 15/313,537

(22) PCT Filed: May 28, 2015

(86) PCT No.: PCT/US2015/032853
§ 371 (c)(1),
(2) Date: Nov. 22, 2016

(87) PCT Pub. No.: WO2015/184078
PCT Pub. Date: Dec. 3, 2015

(65) Prior Publication Data
US 2017/0198900 A1    Jul. 13, 2017

Related U.S. Application Data

(60) Provisional application No. 62/003,766, filed on May 28, 2014, provisional application No. 62/081,506, (Continued)

(51) Int. Cl.
*F21V 8/00* (2006.01)
*F21V 7/00* (2006.01)
(Continued)

(52) U.S. Cl.
CPC .............. *F21V 7/0016* (2013.01); *F21K 9/61* (2016.08); *F21V 7/0008* (2013.01); *F21V 15/01* (2013.01);
(Continued)

(58) Field of Classification Search
None
See application file for complete search history.

(56) References Cited

U.S. PATENT DOCUMENTS

| 8,267,566 B2 | 9/2012 | Iwasaki |
| 2010/0080019 A1 | 4/2010 | Iwasaki |

(Continued)

FOREIGN PATENT DOCUMENTS

| CN | 201228871 B2 | 4/2009 |
| CN | 103649634 B2 | 3/2014 |
| WO | WO2014008687 A1 | 1/2014 |

OTHER PUBLICATIONS

International Application No. PCT/US2015/032853, Notification of Transmittal of the International Search Report and the Written Opinion of the International Searching Authority, dated Mar. 18, 2016, 21 pages.

*Primary Examiner* — Elmito Breval
(74) *Attorney, Agent, or Firm* — Fish & Richardson P.C.

(57) ABSTRACT

A luminaire assembly includes: a substrate extending along a first direction comprising a first material having a first coefficient of thermal expansion; a plurality of light emitting elements (LEEs) secured to the substrate and arranged along the first direction; a light guide composed of a material having a second coefficient of thermal expansion different over an operating temperature range; a plurality of optical elements arranged along the first direction, each optical element being positioned to receive light emitted from a corresponding one or more of the LEEs and to direct the light to an edge of the light guide; a housing; and a heat coupling layer arranged between the substrate and the housing. The substrate and the heat coupling layer are constructed so that each of the plurality of LEEs, while secured to the substrate, remain registered with their corresponding optical element over the operating temperature range.

60 Claims, 10 Drawing Sheets

Related U.S. Application Data filed on Nov. 18, 2014, provisional application No. 62/087,570, filed on Dec. 4, 2014.

(51) Int. Cl.

| | |
|---|---|
| *F21V 15/01* | (2006.01) |
| *F21V 29/85* | (2015.01) |
| *F21V 29/87* | (2015.01) |
| *F21V 29/70* | (2015.01) |
| *F21K 9/61* | (2016.01) |
| *F21Y 103/10* | (2016.01) |
| *F21Y 115/10* | (2016.01) |
| *F21Y 115/00* | (2016.01) |

(52) U.S. Cl.
CPC .............. *F21V 29/70* (2015.01); *F21V 29/85* (2015.01); *F21V 29/87* (2015.01); *G02B 6/0023* (2013.01); *G02B 6/0031* (2013.01); *G02B 6/0055* (2013.01); *G02B 6/0068* (2013.01); *G02B 6/0085* (2013.01); *G02B 6/0088* (2013.01); *G02B 6/0091* (2013.01); *G02B 6/0093* (2013.01); *F21Y 2103/10* (2016.08); *F21Y 2115/00* (2016.08); *F21Y 2115/10* (2016.08)

(56) References Cited

U.S. PATENT DOCUMENTS

| | | |
|---|---|---|
| 2011/0267841 A1 | 11/2011 | Lee et al. |
| 2014/0126235 A1 | 5/2014 | Speier et al. |

LUMINAIRE ASSEMBLY

CROSS-REFERENCE TO RELATED APPLICATIONS

This application is a U.S. National Phase application of International Application No. PCT/US2015/032853, which claims the benefit of priority under 35 U.S.C. § 119(e)(1) of U.S. Provisional Application No. 62/003,766, filed on May 28, 2014, of U.S. Provisional Application No. 62/081,506, filed on Nov. 18, 2014, and of U.S. Provisional Application No. 62/087,570, filed on Dec. 4, 2014, all of which are incorporated by reference herein.

TECHNOLOGICAL FIELD

The present technology relates to luminaire assemblies, and more particularly to luminaire assemblies having robust thermo-mechanical design.

BACKGROUND

Light sources are used in a variety of applications, such as for providing general illumination and providing light for electronic displays (e.g., LCDs). Historically, incandescent light sources have been widely used for general illumination purposes. Incandescent light sources produce light by heating a filament wire to a high temperature until it glows. The hot filament is protected from oxidation in the air with a glass enclosure that is filled with inert gas or evacuated. Incandescent light sources are gradually being replaced in many applications by other types of electric lights, such as fluorescent lamps, compact fluorescent lamps (CFL), cold cathode fluorescent lamps (CCFL), high-intensity discharge lamps, and solid state light sources, such as light-emitting diodes (LEDs).

SUMMARY

Solid state light emitting elements (LEEs), such as light emitting diodes, may be subject to substantial heating during their operation. Thus, luminaire assemblies that incorporate such elements commonly feature components that facilitate dispersion of the heat generated by the LEEs. In particular, solid state luminaires often feature a heat sink to which heat from the LEEs is dissipated and dispersed. Nevertheless, heating of components in a luminaire assembly may present problems to the durability of the luminaire. For instance, where the assembly is composed of components having different coefficients of thermal expansion (CTEs), heating of the assembly may damage the assembly due to, for example, differential thermal, hygroscopic or other expansion of different components. In luminaire assemblies that feature LEEs registered with corresponding optical elements, differential thermal expansion between the optical elements and the substrate supporting the LEEs can cause misalignment between the LEEs and their corresponding optical elements, for example, which can affect optical performance. These issues may be exacerbated in embodiments that feature assemblies extended in one or two directions such as, for example, assemblies that feature an array of LEEs extended a foot or more in one direction. Accordingly, embodiments are disclosed that feature designs for mitigating such effects. For example, embodiments having an array of LEEs extending in a direction include one or more features designed to accommodate differential expansion or contraction between a substrate and an arrangement of optical coupling elements. These regions—also referred to as joints—provide a buffer to accommodate expansion of a substrate along the length of a luminaire assembly, to mitigate catastrophic strain on components of the assembly that may expand by different amounts relative to the substrate material.

Various aspects of the invention are summarized as follows.

In general, in a first aspect, the invention features a luminaire assembly that includes: a substrate extending along a first direction comprising a first material having a first coefficient of thermal expansion; a plurality of light emitting elements secured to the substrate, the light emitting elements being arranged along the first direction; a light guide composed of a material having a second coefficient of thermal expansion different from the first coefficient of thermal expansion over an operating temperature range; a plurality of optical elements arranged along the first direction, each optical element being positioned to receive light emitted from a corresponding one or more of the light emitting elements and to direct the light to an edge of the light guide; a housing; and a heat coupling layer arranged between the substrate and the housing. The substrate and the heat coupling layer are constructed so that each of the plurality of light emitting elements, while secured to the substrate, remain registered with their corresponding optical element over the operating temperature range.

Embodiments of the luminaire assembly may include one or more of the following features and/or features of other aspects. For example, the housing can include a heat sink.

The heat coupling layer can include spaced-apart portions of a heat coupling material. Discontinuities in the spaced apart portions of the heat coupling material may be located at the same location as the light emitting elements in the first direction. The spaced apart portions of the heat coupling layer may extend continuously in the first direction adjacent to at least two or more light emitting elements. Discontinuities in the spaced apart portions of the heat coupling material may be offset from the locations of the light emitting elements in the first direction.

In some embodiments, the spaced apart portions of heat coupling material and portions of the substrate between the LEEs are more rigid than portions of the substrate located adjacent to the LEEs.

The heat coupling layer may include a layer of a flexible material that extends continuously in the first direction adjacent to multiple light emitting elements. The heat coupling layer may adhere the substrate to the housing. In some embodiments, the heat coupling layer includes a silicone foam. In certain embodiments, the heat coupling layer includes a thermal paste and/or a thermal adhesive tape.

The heat coupling layer may accommodate differential thermal expansion between the light guide and optical elements and the heat sink over the operating temperature range.

In some embodiments, the luminaire assembly includes a plurality of registration features each affixing a corresponding one or more optical element to the substrate at a location along the first direction. Each registration feature may extend into the corresponding optical element and into the substrate at the corresponding location. Each registration feature may include a male portion and a female portion shaped to receive the male portion. The substrate can include the male portion of each registration feature and optical elements comprise the female portion. In some embodiments, the registration features are located periodically in the first direction. At least two light emitting elements may be located between adjacent registration features.

The substrate can include one or more joints each located between an adjacent pair of light emitting elements. The substrate can include a layer of a substrate material and each joint comprises a discontinuity in the layer of the substrate material. In some embodiments, the substrate includes a layer of a substrate material and each joint comprises a portion of substrate material having a thickness in at least one dimension that is different from a thickness in that dimension of the substrate material adjacent each light emitting element.

The substrate can include a layer of an electrically-conducting material, the layer of electrically-conducting material being discontinuous at the joints. Portions of flexible electrically-conducting material may electrically couple the layer of the electrically-conducting material on opposing sides of a corresponding joint. The joints may be sufficiently flexible to accommodate a thermal expansion of the substrate over the operating temperature range.

In embodiments, the light emitting elements are light-emitting diodes, such as white light-emitting diodes.

The substrate can include a metal core printed circuit board, a glass-epoxy laminate printed circuit board, a ceramic printed circuit board, or a flexible circuit board.

The housing can include a material having a high thermal conductivity, such as high thermal conductivity materials formed from a metal (e.g., aluminum).

The luminaire assembly may extend about six inches or more in the first direction (e.g., about 12 inches or more, about 24 inches or more, about 48 inches or more in the first direction).

The substrate may include a printed circuit board.

The substrate may include flexible portions between the LEEs and spaced apart portions of heat transfer material.

The optical elements may be compound parabolic reflectors.

Each of the optical elements may include a recess shaped to accommodate the corresponding one or more light emitting elements. In some implementations, an air gap may exist in the recess between the optical element and the corresponding one or more light emitting elements. In other implementations, the one or more light emitting elements may be optically coupled to the corresponding optical element by an optical coupling medium in the recess. In some other implementations, the luminaire assembly may further include a layer containing a wavelength conversion material disposed on a surface of the optical element in the recess. For example, the wavelength conversion material includes a phosphor.

In general, in a further aspect, the invention includes a luminaire assembly that includes: a substrate extending along a first direction including a first material having a first coefficient of thermal expansion; a plurality of light emitting elements secured to the substrate, the light emitting elements being arranged along the first direction; a light guide including a material having a second coefficient of thermal expansion different from the first coefficient of thermal expansion over an operating temperature range; a plurality of optical elements arranged along the first direction, each optical element being positioned to receive light emitting from a corresponding one of the light emitting elements and to direct the light to an edge of the light guide; a housing; and a heat coupling layer arranged between the substrate and the housing. The heat coupling layer can include spaced-apart portions of a heat coupling material and discontinuities in the spaced apart portions of the heat coupling material are located at the same location as the light emitting elements in the first direction.

Embodiments may include one of more of the features described in connection with other aspects of the invention.

In general, in a further aspect, the invention features a luminaire assembly that includes: a substrate extending along a first direction, the substrate including spaced-apart portions of a substrate material; a plurality of light emitting elements secured to the substrate, the light emitting elements being arranged along the first direction, where discontinuities in the spaced apart portions of the substrate material are located between adjacent light emitting elements in the first direction; a light guide; a plurality of optical elements arranged along the first direction, each optical element being positioned to receive light emitting from a corresponding one of the light emitting elements and to direct the light to an edge of the light guide; a housing; and a heat coupling layer arranged between the substrate and the housing.

Embodiments may include one of more of the features described in connection with other aspects of the invention.

In general, in a further aspect, the invention features a luminaire assembly that includes: a substrate extending along a first direction including a first material having a first coefficient of thermal expansion; a plurality of light emitting elements secured to the substrate, the light emitting elements being arranged along the first direction; a light guide including a material having a second coefficient of thermal expansion different from the first coefficient of thermal expansion over an operating temperature range; a plurality of optical elements arranged along the first direction, each optical element being positioned to receive light emitting from a corresponding one or more of the light emitting elements and to direct the light to an edge of the light guide; a housing; and a heat coupling layer arranged between the substrate and the housing. The heat coupling layer includes a layer of a flexible material that extends continuously in the first direction adjacent to multiple light emitting elements.

Embodiments of the luminaire assembly may include one of more of the features described in connection with other aspects of the invention.

Among other advantages, embodiments of the luminaire assemblies may include luminaire assemblies that have robust thermo-mechanical properties. In other words, the luminaire assemblies may be subject to multiple cycles over significant temperature ranges and continue to reliably operate without damage to the assembly. For example, luminaire assemblies may be subject to temperature ranges from below freezing (e.g., −10° C. or lower, which may be experienced during shipment or outdoor applications) to 80° C. or more (e.g., during operation) and maintain alignment of the LEEs to corresponding optical coupling elements despite differential thermal expansion between the optical coupling elements and other components of the assembly.

The details of one or more implementations of the technologies described herein are set forth in the accompanying drawings and the description below. Other features, aspects, and advantages of the disclosed technologies will become apparent from the description, the drawings, and the claims.

BRIEF DESCRIPTION OF THE DRAWINGS

Like elements in different figures are identified with the same reference numeral.

DETAILED DESCRIPTION

Figure 1A:
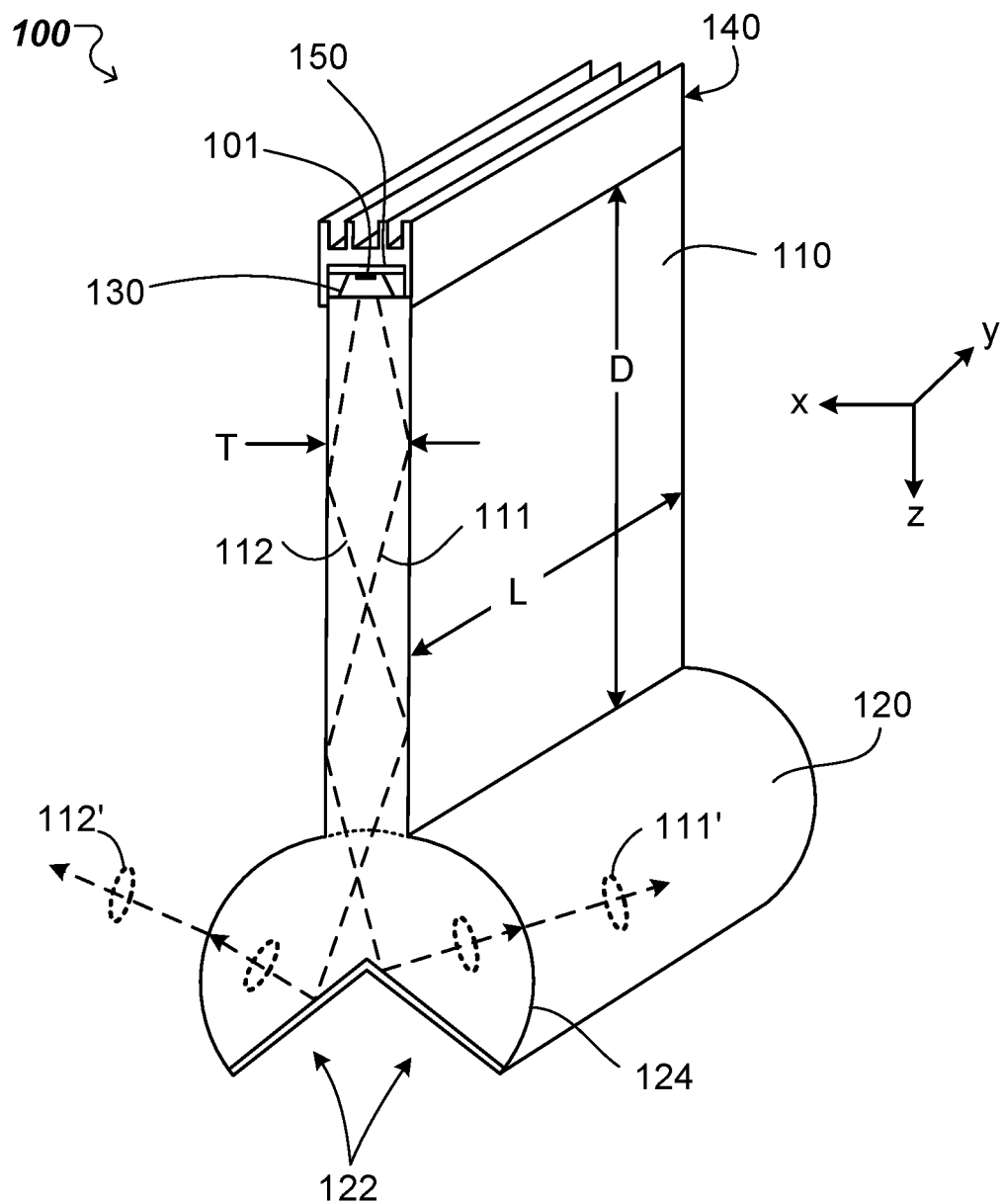
FIGS. 1A-1C show aspects of example luminaire assemblies.

Referring to FIG. 1A, a luminaire assembly 100 includes light emitting elements (LEEs) 101, such as a light emitting diode, a light guide 110, and an optical extractor 120 attached to light guide 110. Light emitting elements 101 are disposed on a substrate 150, which is affixed to a housing 140. Luminaire assembly 100 also includes optical coupling elements 130, which are also attached to substrate 150.

During operation, light emitting elements 101 emit light which is coupled via optical coupling elements 130 into a receiving edge of light guide 110. Light guide 110 guides the light via total internal reflection (TIR) in the z-direction to optical extractor 120 coupled at an opposing edge of the light guide. Here, a distance D between the receiving edge of the light guide 110 and its opposing edge can be 1, 2, 5, 10, 20, 50 or 100 cm, for instance. Light rays 111 and 112 are illustrative paths of the guided light. These rays are guided from optical coupling element 130 through light guide 110 to optical extractor 120. Optical extractor 120 includes reflective surfaces 122 which receive the light from the light guide and reflect it out of the luminaire assembly through transparent curved surfaces 124 of the optical extractor. As depicted in FIG. 1A, rays 111 and 112 exit the luminaire assembly as rays 111' and 112', respectively.

In some embodiments, the optical extractor 120 may be configured to asymmetrically distribute light on either side of the light guide, such that light is output along prevalent directions along rays 111' and 112' that form different angles relative to the z-axis. Exemplary embodiments are described in U.S. Pat. No. 8,506,112 (see, e.g., the embodiments disclosed in FIGS. 13A-13E and 28 therein).

Furthermore, some luminaire assemblies may be configured to emit some light also in a forward direction (in z-direction). Even further, some luminaire assemblies may be configured to emit light only in a forward direction. It is noted that the thermo-mechanical designs described herein can apply to a range of luminaire assemblies including different optical extractors that may emit light on one or both sides of the light guide, symmetrically or asymmetrically and/or only in backward, only in forward or both backward and forward direction.

Luminaire assembly 100 extends along the y-direction of the Cartesian coordinate system shown in FIG. 1A. In general, the length of the luminaire assembly in the y-direction, indicated as L in FIG. 1A, can vary as desired. In some embodiments, for smaller luminaires, the assembly extends a relatively small distance, such as about 6 inches or less (e.g., about 4 inches or less, about 3 inches or less, about 2 inches or less). However, in many embodiments, the assembly extends about 12 inches or more (e.g., about 2 feet, about 3 feet, about 4 feet, about 5 feet, about 6 feet, or more). A thickness T of the light guide 110 orthogonal to the elongated dimension L (e.g., along the x-axis) is chosen to be a fraction of the distance D traveled by the guided light from the receiving edge to the opposing edge of the light guide. For T=0.05 D, 0.1 D or 0.2 D, for instance, light from multiple, point-like LEEs 101—distributed along the elongated dimension L—that is edge-coupled into the light guide 110 at the receiving edge can efficiently mix and become uniform (quasi-continuous) along the y-axis by the time it propagates to the opposing edge.

Figure 1B:
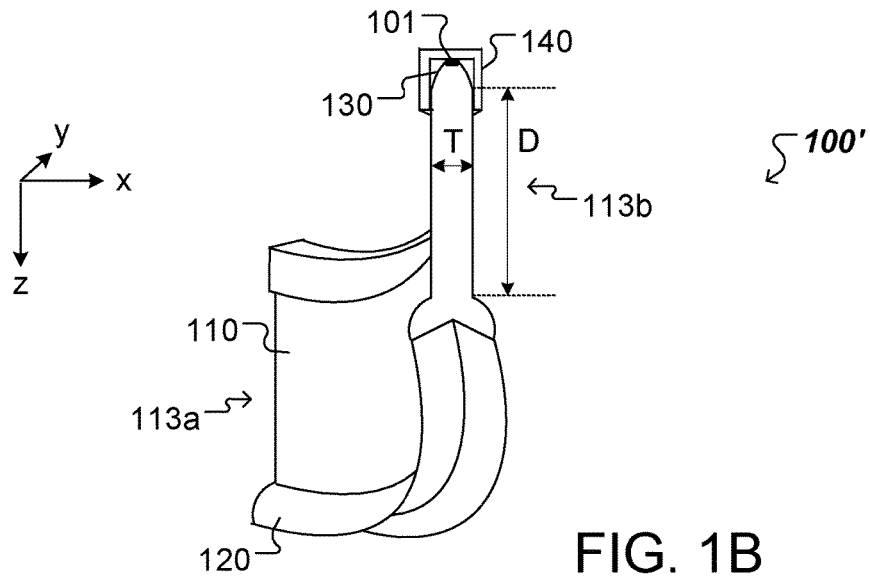

Other open and closed shapes of the luminaire assembly 100 are possible. FIG. 1B shows an example of a luminaire assembly 100' for which the light guide 110 has two opposing side surfaces 113a, 113b that form a portion of a cylinder shell of thickness T. In other cases, the cylinder shell can be circular, can be closed, or can have other shapes. Example luminaire assemblies can have T=0.05 D, 0.1 D or 0.2 D, for instance. Small T/D ratios can cause many reflections of the guided light and light from multiple, point-like LEEs 101—distributed along an elliptical path of length L—that is edge-coupled into the light guide 110 at the receiving edge can efficiently mix and become uniform (quasi-continuous) along such an elliptical path by the time it propagates to the opposing edge. Note that a housing 140 of the luminaire assembly 100' is shaped in conformance with the shape of the cylindrical shell-shaped light guide 110.

Figure 1C:
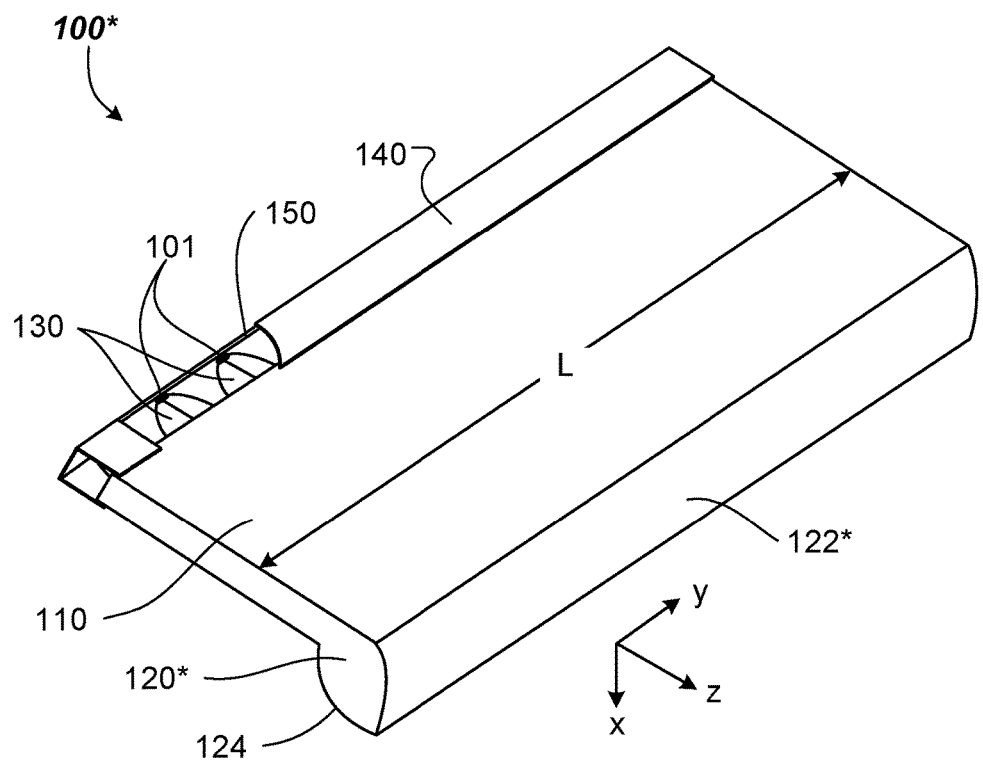

In the example implementations described above in connection with FIGS. 1A-1B, the luminaire assembly 100/100' is configured to output light along prevalent directions given by rays 111' and 112'. In other implementations, the luminaire assembly can be modified to output light from a single side of the optical extractor 120 along prevalent a direction given by ray 112', for instance. FIG. 1C shows such luminaire assembly 100* configured to output light on a single side of the light guide 110 and is referred to as a single-sided luminaire assembly. The single-sided luminaire assembly 100* is elongated along the y-axis like the luminaire assembly 100 shown in FIG. 1A. Also like the luminaire assembly 100, the single-sided luminaire assembly 100* includes a substrate 150 and LEEs 101 disposed on a surface of the substrate along the y-axis. As described above, the substrate 150 is affixed to a housing 140. The single-sided luminaire assembly 100* further includes optical coupling elements 130 and light guide 110. The optical coupling elements 130 are arranged and configured to redirect the light emitted by the LEEs 101 into a receiving edge of the light guide 110, and the light guide is configured to guide the light redirected by the optical coupling elements 130 from the first edge of the light guide to an opposing edge of the light guide. Additionally, the single-sided luminaire assembly 100* includes a single-sided extractor (denoted 120*) to receive the light guided by the light guide 110. The single-sided extractor 120* includes a redirecting surface 122* to redirect the light received from the light guide 110, like described for luminaire assembly 100 with reference to FIG. 1A, and an output surface 124 to output the light redirected by the redirecting surface 122* along a prevalent direction given by ray 112'.

Figure 1D:
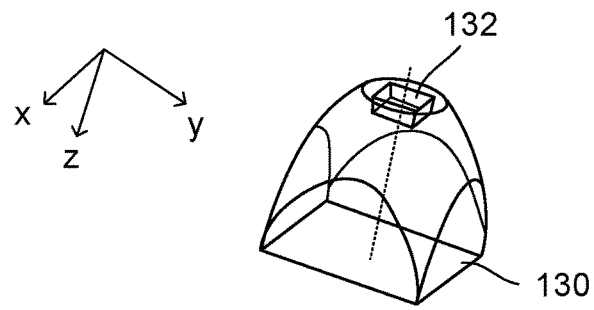
FIG. 1D is an example of an optical coupling element used in the luminaire assemblies shown in FIGS. 1A-1C.

FIG. 1D shows that an optical coupling element 130 of the luminaire assembly 100/100'/100* can include a recess 132 adjacent an input face/aperture in which one or more LEEs 101 can be positioned. For instance, in some embodiments, a single light emitting diode is positioned in recess 132 (e.g., a single white light emitting diode). Alternatively, or additionally, in certain embodiments, two or more light emitting diodes may be positioned in recess 132. For instance, white, red, yellow, green or blue light emitting elements may be positioned in the recess 132.

Optical coupling between the LEEs, e.g., an LED, and the optical coupling elements may be via air/gas or an immersion medium. In some embodiments, an LED having a flat upper surface may be positioned within the recess 132 such that light emitted through the flat upper surface enters the optical coupling element 130 through the recess walls via an air gap. In some embodiments, a glob-top phosphor coated LED die is placed in recess 132 and light extraction occurs similarly. In some embodiments, the low refractive index air gap between the LED and optical coupling element 130 is replaced with a solid, gel, or liquid optical coupling material of higher refractive index (e.g., 1.35-1.55, typically, but higher values are possible). Possible materials include silicones (e.g., silicone gels), epoxies, optical adhesive films, or greases. Due to the higher refractive index relative to air, it is believed that more light will be extracted out of an LED that otherwise would have been confined to the LED via total internal reflection with an air gap. Fresnel losses at the interface between the optical coupling material and the optical coupling element 130 are also reduced or possibly eliminated with adequate index-matched materials. It is believed that efficiency enhancements on the order of 10-25% may be achieved using an optical coupling material in this way, depending on the optical coupling material, LED and optical coupling element 130. In other implementations, recesses may be omitted from the optical coupling elements 130 and LEEs may be disposed adjacent the input face/aperture.

Figure 1E:
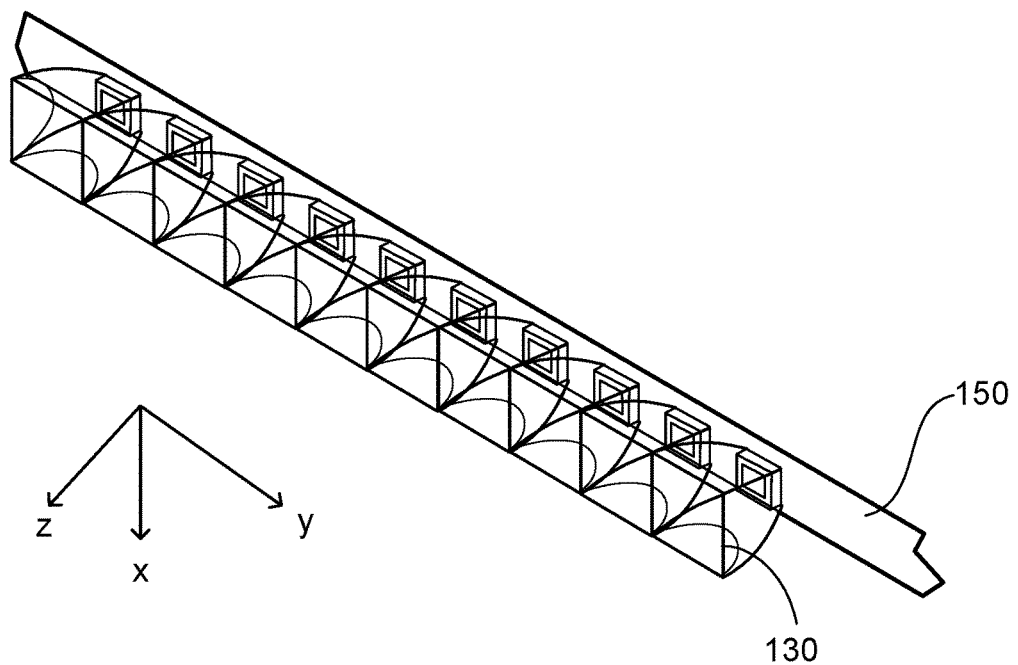
FIG. 1E is an example of an array of optical coupling elements like the one shown in FIG. 1D.

FIG. 1E shows that, in general, luminaire assembly 100/100'/100* includes multiple optical coupling elements 130 disposed along substrate 150.

Referring again to FIG. 1D, optical coupling element 130 is an optical element shaped to efficiently couple light from the corresponding LEE into the edge of light guide 110. For example, optical coupling element 130 can be a compound parabolic concentrator having edges that are truncated to size the element for the light guide. More generally, optical coupling elements may include other geometry concentrators, such as compound elliptical concentrators (CEC) or compound hyperbolic concentrators (CHC). In some embodiments, optical coupling elements may include one or more lenses or other optical elements, for example. Optical coupling elements may be solid elements formed form a transparent material, such as a plastic, that direct light from the LEE via TIR. Alternatively, optical coupling elements may include surfaces that include a reflective surface, such as a metallic surface (e.g., aluminum or silver), functioning as a curved mirror. Such elements may be solid or hollow.

In general, optical coupling elements 130 may be separate elements that are secured together in the assembly, or several optical coupling elements may be integrally formed. For example, two or more optical coupling elements may be formed from a single, integral piece of material. In some embodiments, the optical coupling elements are formed from units composed of multiple (e.g., four, five, six, seven, eight, or more) integral optical coupling elements.

In general, LEEs 101 are devices that emit light in a region or combination of regions of the electromagnetic spectrum that includes the visible region, infrared and/or ultraviolet region, when activated, e.g., by applying a potential difference across it or passing a current through it. LEEs may have monochromatic, quasi-monochromatic, polychromatic or broadband spectral emission characteristics. Examples of LEEs include semiconductor, organic, or polymer/polymeric light-emitting diodes (LEDs), optically pumped phosphor coated LEDs, optically pumped nanocrystal LEDs or any other similar LEDs. Furthermore, the term light-emitting element is used to define the specific device that emits the radiation, for example a LED die, and can equally be used to define a combination of the specific device that emits the radiation together with a housing or package within which the specific device or devices are placed. Examples of light emitting elements include also lasers and more specifically semiconductor lasers, such as VCSEL (Vertical cavity surface emitting lasers) and edge emitting lasers. Further examples may include superluminescent diodes and other superluminescent devices.

The number of LEEs 101 of the luminaire assembly 100 generally depends, inter alia, on the length L, where more LEEs are used for longer luminaire assemblies. In some implementations, the number of LEEs 101 can include between 10 and 1,000 LEEs (e.g., about 50 LEEs, about 100 LEEs, about 200 LEEs, about 500 LEEs). Generally, the density of LEEs (e.g., number of LEEs per unit length) also depends on the nominal power of the LEEs and luminance desired from the luminaire assembly. For example, a relatively high density of LEEs can be used in applications where high luminance is desired or where low power LEEs are used. In some implementations, the luminaire assembly 100 has LEE density along its length of 0.1 LEE per centimeter or more (e.g., 0.2 per centimeter or more, 0.5 per centimeter or more, 1 per centimeter or more, 2 per centimeter or more). In some implementations, LEEs can be evenly spaced along the length, L, of the luminaire assembly. Luminaire assemblies in general can include one or multiple types of LEEs, for example one or more subsets of LEEs in which each subset can have different color or color temperature.

In general, LEEs 101 may be coupled to their corresponding optical coupling elements 130 in a variety of ways. In some embodiments, particularly where the optical coupling elements 130 are formed from a solid transparent material, light emitting elements 101 may be optically coupled to their optical coupling elements using a medium (e.g., a solid, liquid, or gel) with suitable adhesion, cohesion and chemical properties that has a refractive index similar to the refractive index of the material from which the optical element is formed. Examples of such media include silicone (e.g., a single part or dual-part compound, e.g., thermally or UV curable) or epoxy. In certain embodiments, where no medium is used, a gap may exist between the surface of the light emitting element and the optical coupling elements.

Substrate 150 provides a base layer on which light emitting elements 101 and electrical conductors for delivering electrical power to the light emitting elements can be mounted. LEEs 101 are secured to substrate 150, e.g., by solder and/or an adhesive. In general, the LEEs are secured to the substrate such that the LEEs move with the substrate as the substrate expands or contracts with thermal changes.

Typically, substrate 150 is formed, at least in part, from a rigid material. In some embodiments, substrate 150 includes a printed circuit board (PCB). For example, substrate 150 can include a board or boards that mechanically support and electrically connect electronic components using conductive tracks, pads and other features etched from copper sheets laminated onto a non-conductive substrate. PCBs can be single sided (e.g., one copper layer), double sided (e.g., two copper layers) or multi-layer. Conductors on different layers can be connected with plated-through holes or vias. In some embodiments, PCBs may contain components—capacitors, resistors or active devices—embedded in the substrate. Examples of PCB's include metal core printed circuit boards (MCPCBs), glass-epoxy laminates (e.g., FR-4) PCBs, ceramic PCBs, flexible circuits boards and rigid circuit boards with flexible interconnects Alternatively, or additionally, in certain embodiments, substrate 150 includes flexible electronics—also known as flex circuits—which include electronic devices mounted on flexible plastic substrates, such as polyimide, PEEK or transparent conductive polyester film.

Optical coupling elements 130 may also be secured to substrate 150. For example, in some embodiments, the optical coupling elements are bonded to the substrate using, e.g., an adhesive, such as an epoxy adhesive.

Referring back to FIG. 1A, generally, light guide 110 is formed from a solid transparent material (e.g., an organic or inorganic dielectric material transparent at visible wavelengths) having smooth opposing surfaces that facilitate TIR of the light. In many implementations, the opposing surfaces are parallel (i.e., both extend parallel to the y-z plane of the Cartesian coordinate system provided in FIG. 1A for reference).

Light guide 110 is optically coupled to optical coupling elements 130 at an edge of the light guide so that the coupling elements may edge-couple light from the light emitting elements into light guide 110. In some embodiments, an optical adhesive may be used to bond optical coupling elements 130 to the edge of light guide 110.

Housing 140 is generally used to provide a rigid base for securing other components of luminaire assembly 100 together. For instance, both light guide 110 and substrate 150 are secured to housing 140. Housing 140 may also include connectors and other mounting components. For instance, housing 140 can include attachments for connecting to one or more cables for suspending the luminaire assembly from a ceiling, or attachments for connecting the luminaire assembly to a frame.

In addition to providing mechanical support, housing 140 may also function as a heat sink for the luminaire assembly. For example, housing 140 may function as a passive heat exchanger that cools the luminaire assembly by dissipating heat into the surrounding medium. Accordingly, in some embodiments, housing 140 includes a material that has a high thermal conductivity to facilitate heat dissipation. Such materials include, for example, certain metals, including (but not limited to) aluminum and aluminum alloys (e.g., alloys 1050A, 6061, or 6063) and copper. In some embodiments, composite materials including metals and/or plastic can be used. Examples are copper-tungsten pseudoalloy, AlSiC (silicon carbide in aluminum matrix), Dymalloy (diamond in copper-silver alloy matrix), and E-Material (beryllium oxide in beryllium matrix). Some composite materials may be sintered. Such housing 140 may be formed from a single piece of high thermal conductivity material, for instance, from a single piece of machined or extruded metal/metal alloy or from a single piece of cast matrix.

Light emitting elements 101 may generate significant heat while operating. This heat is transferred into the structure nearby the light emitting elements including substrate 150 and optical coupling elements 130 causing thermal expansion of those components. Depending on the materials of which these components are formed, relative expansion of these components may differ over at least a part of the temperature range experienced by the components. Accordingly, as described in more detail below, in certain embodiments luminaire assemblies are constructed in a manner that thermal expansion of various components of the assembly does not result in damage to the luminaire assembly. For example, assemblies may be constructed so that differential thermal expansion of various components may be accommodated without misalignment of the light emitting elements with respect to their corresponding optical coupling element. Such implementations may be particularly beneficial in luminaire assemblies that extend significantly in one (or more) dimensions, where thermal expansion in the extended direction may be significant. Moreover, in addition to accommodating differential thermal expansion between different components, the construction of luminaire assemblies may be sufficiently robust to withstand mechanical shock, e.g., such as standard drop tests or impacts associated with shipping and installing light fixtures.

Referring to FIGS. 2A-2E, a luminaire assembly 200 includes a light guide 210, a housing 240, optical coupling elements 230, a substrate 250, and a heat coupling layer 252. The details of light guide 210 and optical coupling elements 230 are the same as those discussed above and not repeated here. The thermo-mechanical design is independent of the particular extractor technology, which is hence not further shown in FIGS. 2A-2E.

In general, substrate 250 provides a support for the light emitting elements and electrical contacts for connecting the light emitting elements to a power supply. In some embodiments, substrate 250 is a printed circuit board.

Substrate 250 is thermally coupled to housing 240 via a heat coupling layer 252, which facilitates transfer of heat through substrate 250 to housing 240. Accordingly, in embodiments, heat coupling layer 252 is formed from a material having a relatively high thermal conductivity. In certain embodiments, heat coupling layer 252 is formed from a shock absorbent material (e.g., a foam), improving resistance of the luminaire assembly to vibration or mechanical shock.

In some embodiments, heat coupling layer 252 is formed from a thermal pad, such as a thermal pad formed from a thermally conductive silicone. In some embodiments, thermally conductive adhesive transfer tapes, such as those commercially-available from 3M Company (Maplewood, Minn.) may be used.

The example housing 240 has a U-shaped profile and includes apertures 242 positioned and sized to accommodate flexible electrical connectors 256 (e.g., wire loops). While luminaire assembly 200 as depicted has seven apertures 242, in general, the number of apertures can vary. Assemblies should have sufficient apertures to accommodate each of the flexible electrical connectors in the luminaire assembly. If the luminaire assembly is short enough apertures 242 may be omitted. Furthermore, housings of other luminaire assemblies can have an L-shape sectional profile (not illustrated) or other sectional profile.

Light guide 210 is secured to housing 240 by fasteners 248 (e.g., threaded fasteners, such as screws or bolts). The fasteners 248 engage the light guide 210 via holes 248'. Some holes 248' are shaped to provide tight fits others are shaped to provide sliding fits for corresponding fasteners 248. Holes can be formed as slits oriented along the y-direction to allow sliding of the light guide 210 along a portion of its length relative to the housing 240 during thermal expansion/contraction. The light guide 210 and the housing 240 in the luminaire assembly 200 can be accurately registered with one or more tight fitting hole/fastener combinations. Compared to locating a tight fitting hole/fastener combinations proximate an end of the light guide 210, locating it halfway along the length of the light guide 210 provides half the absolute length change during thermal expansion on either side of the tight fit. Luminaire assemblies with one light guide can use one tight fitting hole/fastener combination with the remaining hole/fastener combinations configured to allow sliding in y-direction.

Figure 2A:
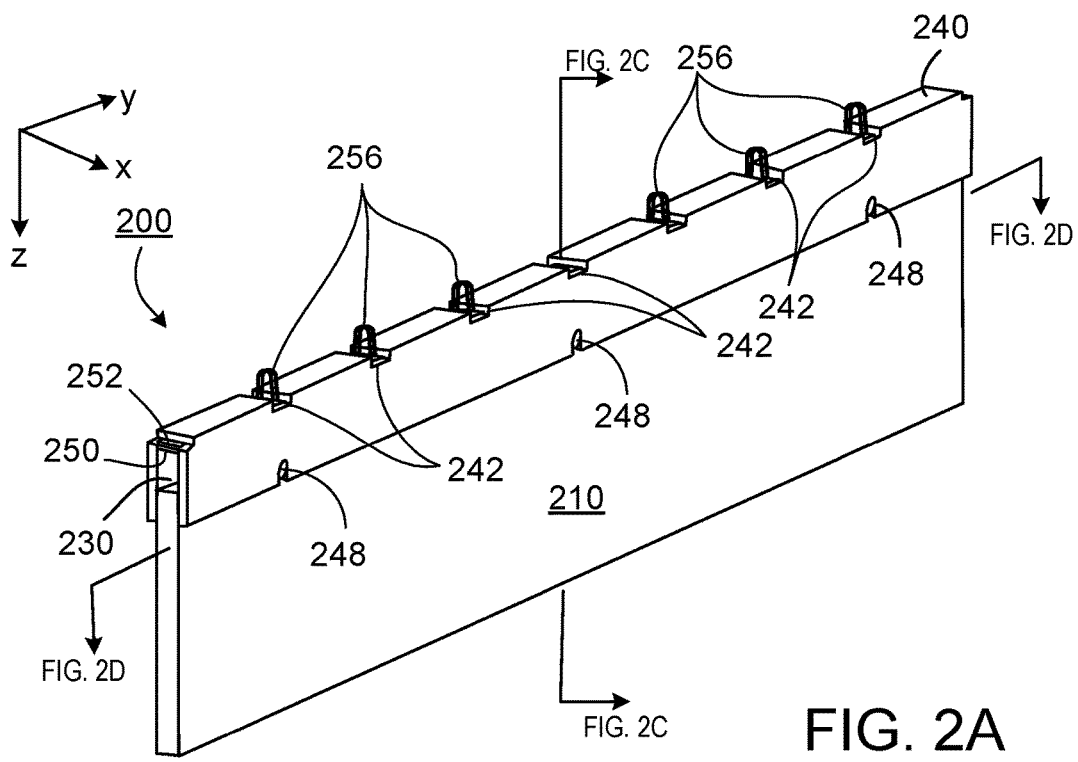
FIG. 2A is a perspective view of components of an embodiment of a luminaire assembly.
Figure 2B:
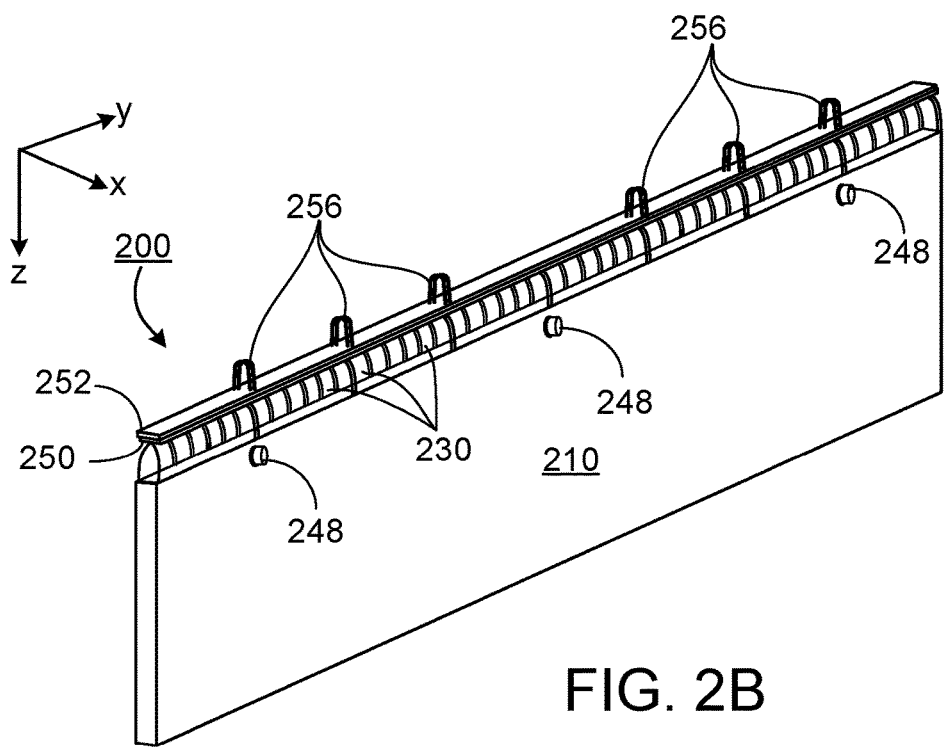
FIG. 2B is a perspective view of components of the luminaire assembly shown in FIG. 2A with the housing removed.
Figure 2C:
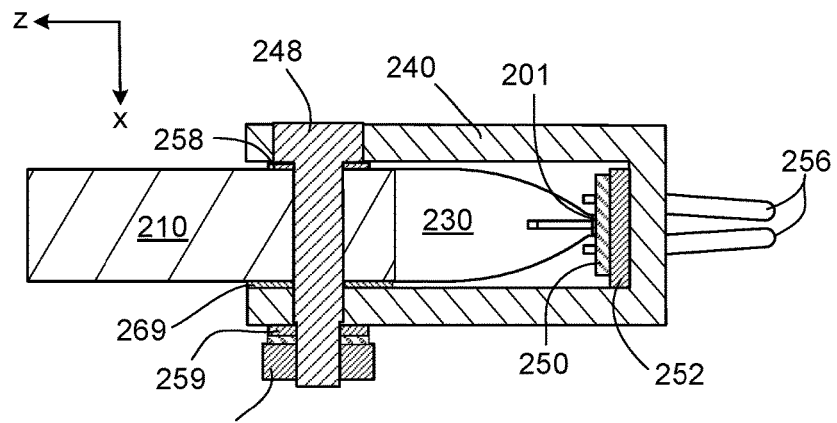
FIG. 2C is a cross-sectional view of components of the luminaire assembly shown in FIG. 2A.

Referring specifically to FIG. 2C, bolt 248 is secured on the opposite side of housing 240 by a nut 249. In this example, only the end of the bolt 248 opposite its head has a threading configured to engage the nut 249. The portion of the bolt 248 between the threading and the head has a smooth surface. Washers 258, 259, and 269 (e.g., metal or plastic washers) are also included in order to distribute the load of fasteners 248 on the surface of light guide 210 and housing 240. As described herein, the mounting of light guide 210 to housing 240, along with the other components, places pressure on heat transfer layer 252 but allows for expansion and contraction of the components of the luminaire assembly during the thermal cycle of the device (e.g., heating up after activation and cooling down to room temperature after deactivation) without significant relative displacement between the components that may otherwise cause performance reduction of the luminaire. The range of temperatures spanned by a component during the thermal cycle is referred to as the operating temperature range of the luminaire assembly.

In some embodiments, the bolt may be configured to directly thread into the lower portion of the housing 240 without the use of a nut.

Generally, the operating temperature range varies between about room temperature and the maximum temperature of respective components. Typically, the components achieving the highest temperature are the LEEs. While the operating temperature range may vary depending on the specifics of the assembly, in some embodiments luminaire assemblies may have an operating temperature range from about 20° C. to about 70° C., with certain components, such as the LEDs themselves, reaching temperatures in excess of 70° C. (e.g., 100° C. or more)

Figure 2D:
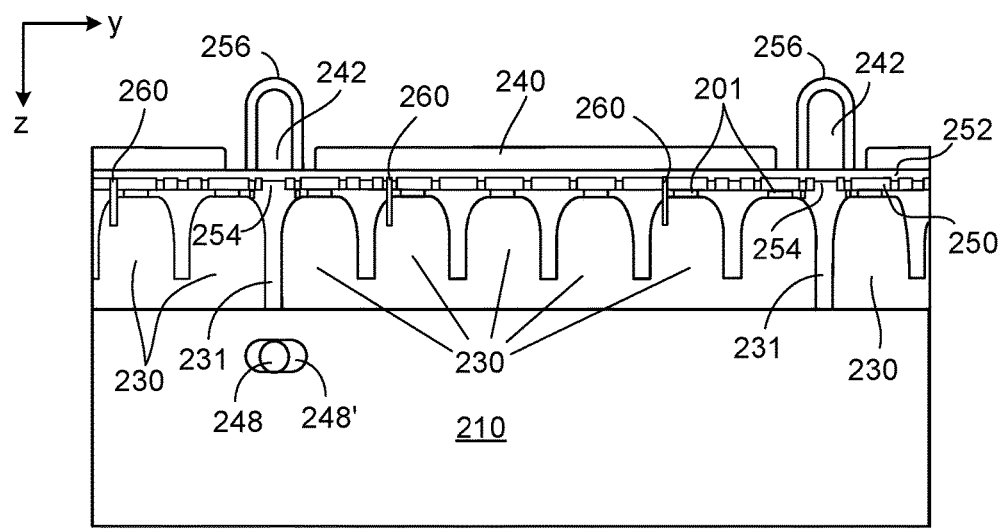
FIG. 2D is another cross-sectional view of components of the luminaire assembly shown in FIG. 2B.
Figure 2E:
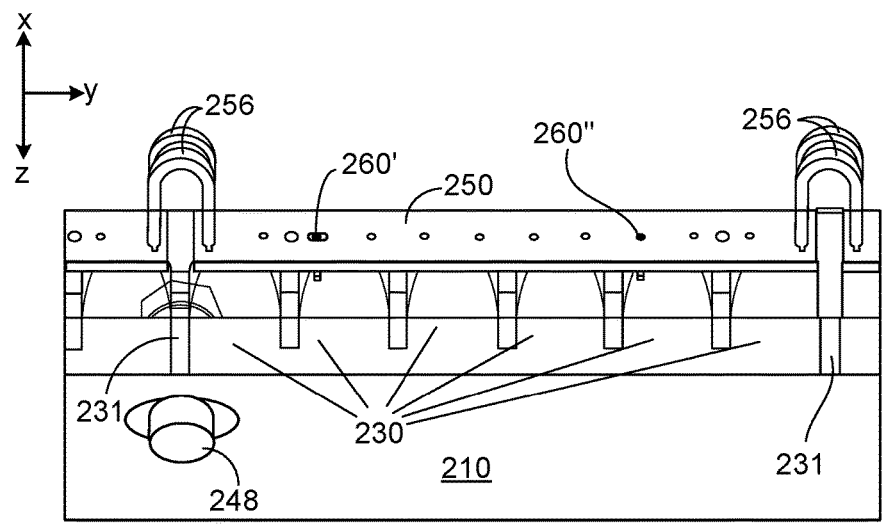
FIG. 2E is a perspective view of components of the luminaire assembly shown in FIG. 2D with the heat transfer layer removed.

Referring specifically to FIG. 2D which shows a portion of luminaire assembly 200 in a side cross-sectional view, and FIG. 2E which shows the portion of luminaire assembly 200 in perspective view with thermal coupling layer 252 removed. In this example, the optical coupling elements 230 are provided in units of six integrally-formed optical coupling elements. The units are separated from each adjacent unit by a gap 231.

Similarly, substrate 250 is composed of multiple portions each separated by a gap 254. Gaps 231 and 254 are positioned at the same location in the y-direction, corresponding also to apertures 242 in housing 240 and flexible electrical connectors 256. Heat coupling layer 252 extends over gap 254. Flexible electrical connectors electrically connect conductors on adjacent portions of substrate 250.

Collectively, these features (i.e., gaps 231 and 254 along with flexible electrical connectors 256) provide joints in the assembly that accommodate thermal expansion of the portions of substrate 250 and units of optical coupling elements 230 without applying significant stress on adjacent portions and units. Accordingly, gaps 231 and 254 should be sufficiently large to accommodate the amount of thermal expansion experienced by the luminaire assembly. In some embodiments, gaps 231 and 254 range in size from about 0.1 mm to about 5 mm (e.g., about 1 mm, about 2 mm, about 3 mm, about 4 mm) in the y-direction. The size of gap 231 in the y-direction may be the same or different from the size of gap 254. Generally, each gap 231 may have the same length in the y-direction or the length of gap 231 may vary from gap to gap. Similarly, each gap 254 may have the same length in the y-direction or the length of gap 254 may vary from gap to gap.

Furthermore, each of the units of optical coupling elements 230 is attached to the corresponding portion of substrate 250 via two pins 260. These pins extend from optical coupling elements into corresponding holes 260' and 260" in substrate 250 that are shaped to receive the pin. Holes 260" are shaped to provide a tight fit for corresponding pins and holes 260' are shaped to provide a sliding fit for their respective pins that allows sliding along a portion of the length of the substrate in y-direction to accommodate differential thermal expansion/contraction. Each unit of optical coupling elements 230 and the corresponding substrate 250 in the luminaire assembly 200 can be accurately registered with one or more tight fitting hole/pin combinations. Compared to locating a tight fitting hole/pin combination proximate an end of a unit of an optical coupling element 230, locating it halfway along the length of the unit provides half the absolute length change during thermal expansion on either side of the tight fit.

Generally, the pins are formed from a rigid material (e.g., a rigid metal) and extend sufficiently deep into the optical coupling element so that the unit of optical coupling elements 230 remains registered in the y-direction to the pin notwithstanding thermal expansion of the luminaire assembly. In some embodiments, the pins are about 2 cm or less in length (e.g., from 1 mm to 2 cm, such as about 1 cm).

In some embodiments, the pins may be further secured to the optical coupling element using an adhesive or other gap filler.

While the foregoing embodiment includes pins 260 for attaching optical coupling elements 230 to substrate 250, other registration features may be used. For example, threaded fasteners or features provided directly by the optical couplers and extending in the x-direction may be used. Moreover, while pins 260 are depicted as extending only into substrate 250, in other embodiments the pins may extend into other components of assembly 200, such as into thermal coupling layer 252 or housing 240. In addition, while pins 260 extend from substrate 250 into a hole in the optical coupling element, in other embodiments, the female/male portions of the registration feature may be reversed. Pins can also be separate components configured to engage with corresponding openings in both the substrate and one or more optical coupling elements. In general, the number of registration features per unit of optical coupling elements may also vary (e.g., each unit may include one registration feature or may include more than two registration features, such as three, four, or five features). In some embodiments, each of the optical coupling elements 230 has a corresponding registration feature.

Figure 3:
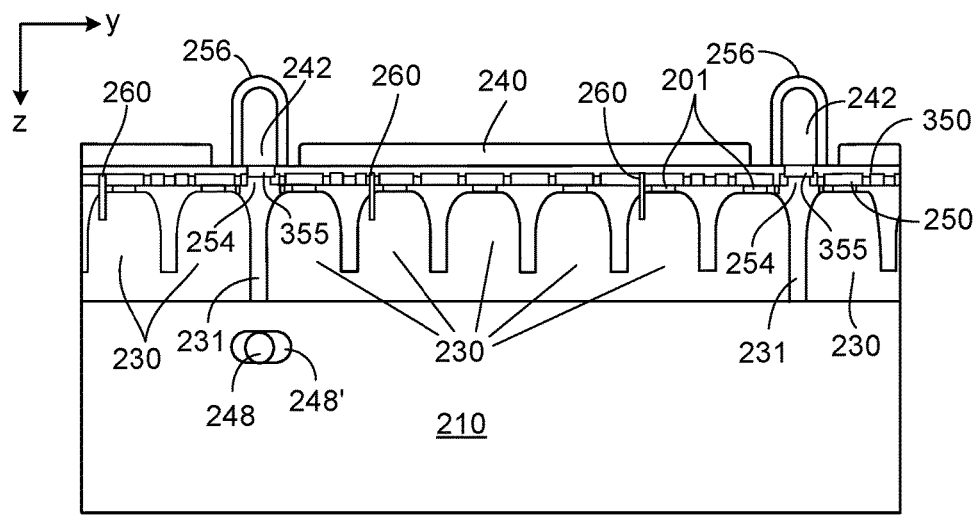
FIG. 3 is a cross-sectional view of components of another embodiment of a luminaire assembly.

In some embodiments, heat transfer layer 252 can include discontinuities in the y-direction. For example, referring to FIG. 3, a luminaire assembly includes a heat transfer layer 352 that includes discontinuities 355 at the same location in the y-direction as flexible electrical conductors 256. Generally, discontinuities may be the same length as gaps 254 in substrate 250, or different.

Figure 4A:
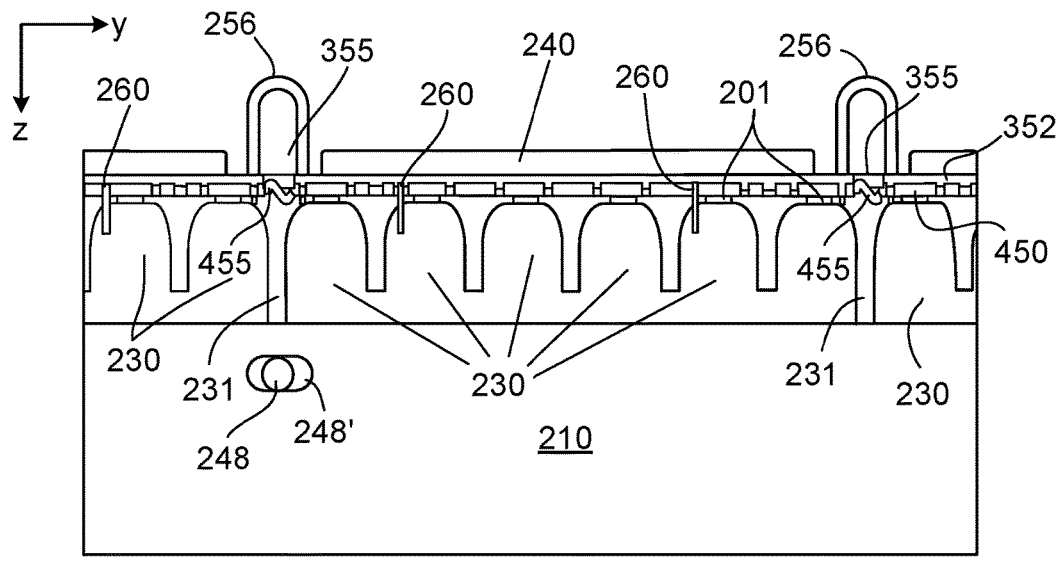
FIG. 4A is a cross-sectional view of components of yet another embodiment of a luminaire assembly.
Figure 4B:
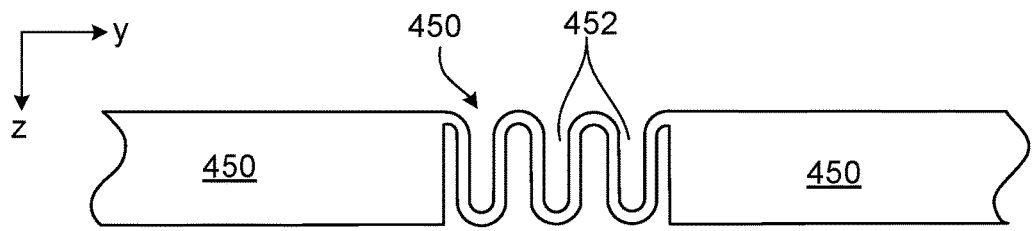
FIG. 4B is a cross-sectional view of a substrate having flexible portions.

While the foregoing embodiments all feature a substrate 250 having discontinuities (i.e., gaps 254 in FIGS. 2D, 2E, and 3), other implementations are also possible. For example, referring to FIG. 4A, in some embodiments a luminaire assembly includes a substrate 450 having flexible portions 455 at the joints in the assembly. Here, flexible portions 455 can be folded or corrugated in order to accommodate expansion or contraction of the rigid portions of substrate 450. Generally, flexible portions 455 of substrate 450 may be formed from the same material as the rigid portions of the substrate. The flexible portions can have the same section or be thinner in one or more dimensions such that they are more flexible than the rigid portions. For example, referring to FIG. 4B, in some embodiments, a substrate 450 includes flexible portions 455 that feature interdigitated channels 452 (e.g., formed by routing) in another otherwise rigid material (e.g., MCPCB or an epoxy-glass laminate PCB). The channels reduce locally the thickness of the substrate material and result in a portion having more flexibility than the other regions of the substrate material.

Generally, portions 455 are sufficiently flexible so that, over the thermal cycle, they are able to distort to absorb contraction or expansion of the substrate as a whole without the rigid portions of the substrate experiencing flexing. In general, the flexible portions are spaced between light emitting elements 201 in the y-direction, so that the light emitting elements are mounted on rigid portions of the substrate.

Figure 4C:
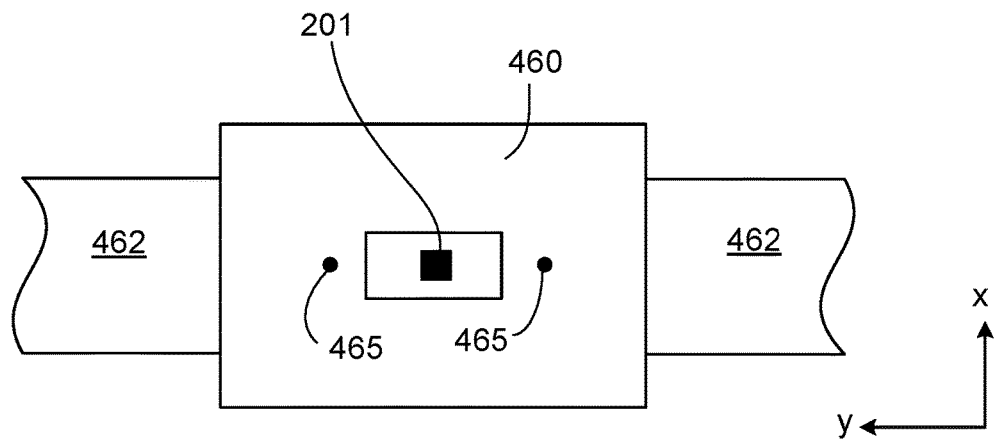
FIG. 4C is a top view of another substrate having flexible portions.

Alternatively, flexible portions and rigid portions may be formed from different materials. For example, referring to FIG. 4C, in some embodiments, light emitting elements 201 are mounted on a discrete rigid carrier substrate 460 (e.g., a ceramic PCB, MCPCB, or epoxy-glass laminate PCB) that is connected to other rigid carrier substrates (not shown) via flexible portions 462 (e.g., flexible circuit boards). Registration features 465 (e.g., pins) are also shown.

In some embodiments, the flexible electrical conductor can be affixed to the flexible portions of the substrate, so that separate flexible conductors 256 are not necessary.

Figure 5A:
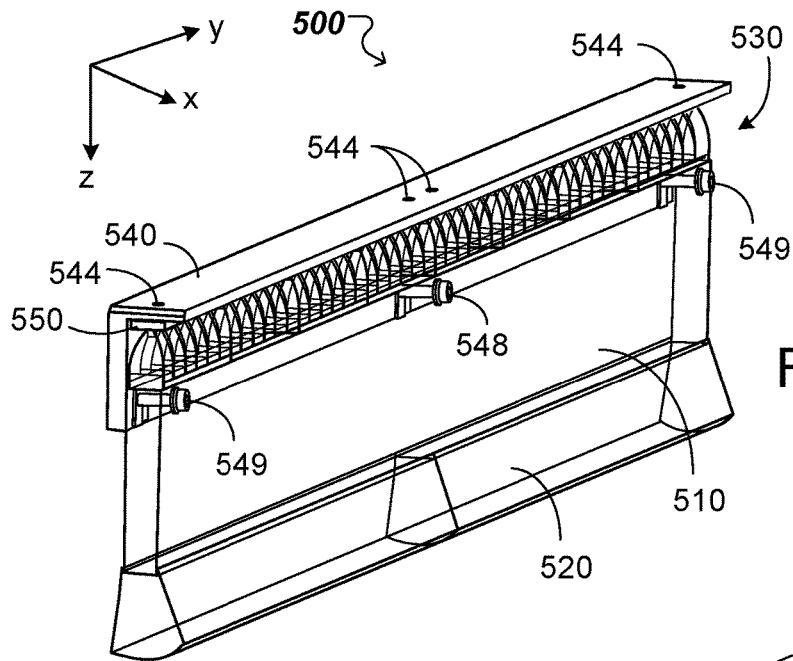
FIG. 5A is a perspective view of another example luminaire assembly.
Figure 5B:
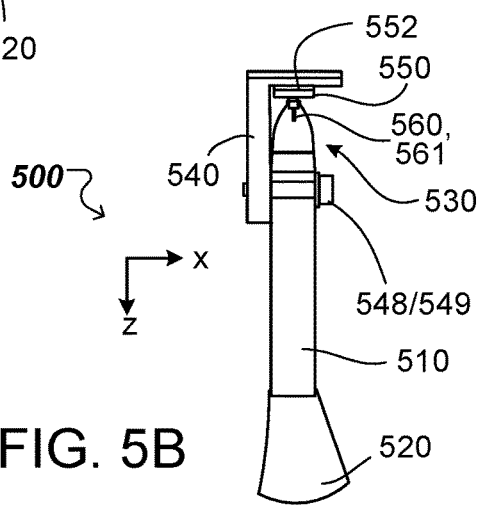
FIG. 5B is a side view of the luminaire assembly of FIG. 5A.
Figure 5C:
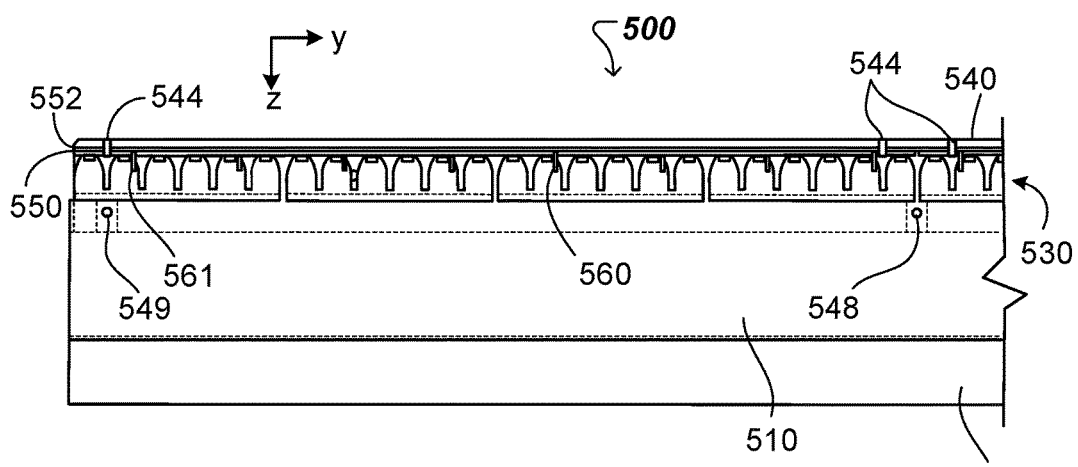
FIG. 5C is a front view of a portion of the luminaire assembly of FIG. 5A.

FIGS. 5A-5C show another example luminaire assembly 500. FIG. 5A is a perspective view and FIG. 5B is a side sectional view of the luminaire assembly 500. FIG. 5C is an elevated view of a portion of the luminaire assembly 500. The example luminaire assembly 500 has an elongate substantially linear extension of length L. The luminaire assembly comprises a number of components including a housing 540, a heat coupling layer 552, two substrates 550 with LEEs, optical coupling elements 530, a light guide 510, an optical extractor 520, various fasteners and pins, for example. Although illustrated with a specific example extractor 520, luminaire assembly 500 can include other configurations of extractors.

Depending on the embodiment and to protect the LEEs, the optical couplers 530 may be shaped to include protrusions that are shaped to abut against the substrate while keeping a certain distance between the optical couplers 530 and the LEEs. Similarly, a distance layer (not illustrated here but shown in example embodiment of FIGS. 6A-6B) with openings configured to accommodate the LEEs may be placed between the optical couplers 530 and the substrate 550. The opening of such a distance layer may be configured to provide certain optical properties to aid in the coupling of light from the LEEs into the couplers. Furthermore, the substrates 550 may include pockets in which the LEEs may be fully or partially recessed.

The luminaire assembly 500 is configured similar to the luminaire assembly 200. By comparison, a number of differences exist. For example, the housing 540 has an L-shaped sectional profile that is configured to accommodate a substrate 550 that is wider in x-direction. This also allows for easy access to the substrate 550 in the assembled configuration. The two substrates 550 can be electrically interconnected in different manners as described or individually directly connected to a suitable power source and/or controller.

In this example, the optical coupling elements 530 are grouped in units of six couplers. The luminaire assembly 500 as a whole includes eight such units. Each unit is coupled with the substrates 550. Furthermore, the heat coupling layer 552, the substrate 550 and the optical subsystem are configured to allow large lengths L of the luminaire assembly 500 while utilizing effective opto-electro-mechanical interconnections. For this purpose the two substrates 550, each approximately L/2 long, are coupled with the housing 540 via pin/hole combinations 544 that are configured to allow sliding along a portion of the length of the luminaire assembly 500 to accommodate differential thermal expansion/contraction and registration. The sliding pin/hole combinations 544 extend through the heat coupling layer 552 which is sandwiched between the housing 540 and the substrate 550.

Each of the units of the optical couplers 530, which may be adhered to or integrally formed with the light guide 510, is configured to receive up to two pins configured to engage with corresponding mating holes in the substrate 550 or vice versa. The engagement is configured to form a tight 560 or sliding 561 interconnection between the substrate 550 and the units of optical couplers 530. In this example, three such interconnections are employed per substrate 550 namely a tight fitting interconnection 560 located approximately at half of the length (in y-direction) of each substrate, and two sliding interconnections 561 proximate opposite (in y-direction) ends of each substrate 550. Moreover, holes in the light guide 510 are provided to engage with corresponding fasteners in a tight 548 or sliding (in y-direction) 549 combination. Corresponding holes can have a circular or elongate (in y-direction) shape. The fasteners can be tightly connected with the housing 540 as described herein. In combination with the various described pin and hole combinations, the fastener/hole combinations 548/549 are arranged relative to the housing 540 to provide adequate opto-mechanical coupling between the optical couplers and the LEEs of the substrate 550 as well as proper thermo-mechanical coupling between the substrate 550, the heat coupling layer 552 and the housing 540. As such pressure and friction levels between the noted components in respective directions are maintained that allow for sufficient differential thermal or other expansion and ensure proper operational conditions through the operating temperature range. By comparison, the particular arrangement of the various tight and sliding couplings in the example luminaire assembly 500 can maintain like differential thermal expansion conditions in y-direction up to about four times the length of a luminaire assembly that has no sliding couplings and only tight couplings.

Figure 6A:
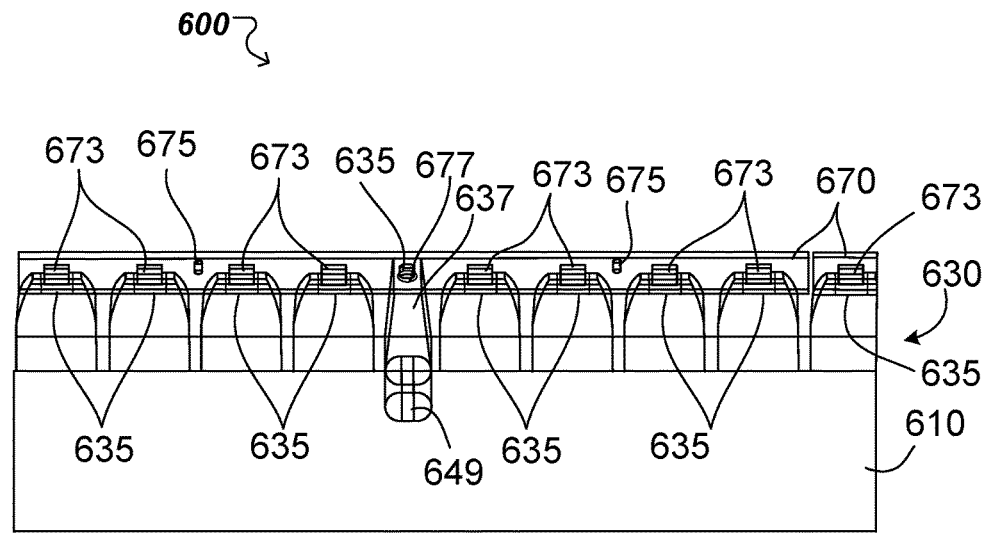
FIG. 6A is a perspective view of a portion of another example luminaire assembly.
Figure 6B:
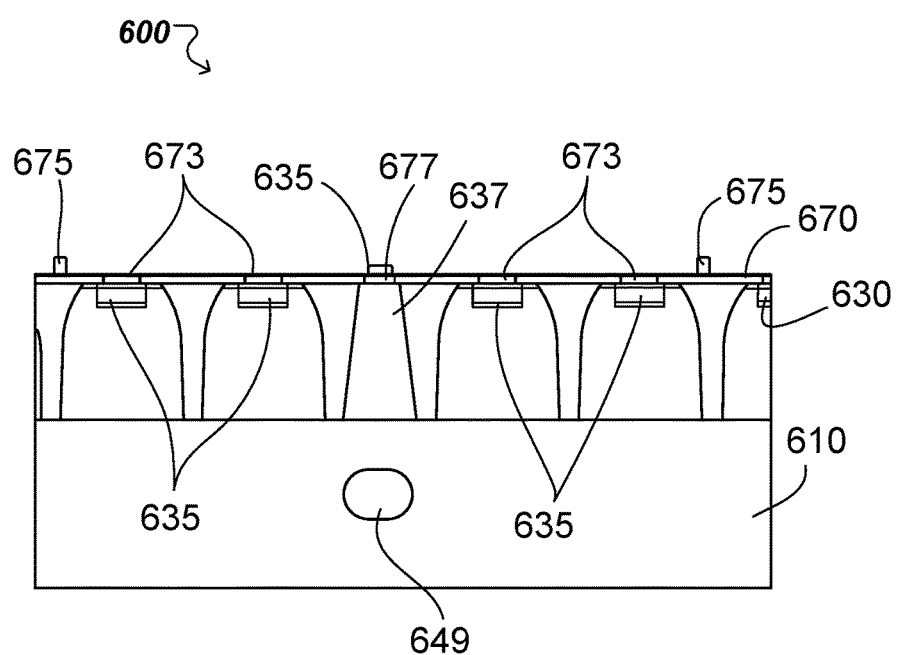
FIG. 6B is a side view of a portion of the luminaire assembly of FIG. 6A.

FIGS. 6A-6B show another example luminaire assembly 600. FIG. 6A is a perspective view and FIG. 6B is a side sectional view of a portion of the luminaire assembly 600. The example luminaire assembly 600 has an elongate substantially linear extension of length L. The luminaire assembly comprises a number of components including a housing (not illustrated), a heat coupling layer (not illustrated), multiple substrates (not illustrated) with LEEs, distance layers 670, optical coupling elements 630 and a light guide 610. The luminaire assembly 600 can further include an optical extractor (not illustrated) and various fasteners and pins, for example. Although not illustrated with a specific example extractor, luminaire assembly 600 can include different configurations of extractors.

The distance layer 670 is disposed between the couplers 630 and the substrate (not illustrated). The distance layer 670 has through holes 673 for receiving LEEs mounted on the substrate that are sized to provide adequate space for lateral movement of the through holes 673 relative to the LEEs due to differential thermal or hygroscopic expansion, for example. In this example, the through holes 673 are arranged to align with pockets 635 in the optical couplers 630 which are shaped to aid in the coupling of light from the LEEs into the light guide 610.

The distance layers 670 are configured to keep a certain distance between the optical couplers 630 and the LEEs. The through holes 673 can be configured to provide high reflectivity to aid in the coupling of light from the LEEs into the optical couplers 630.

Each distance layer 670 has two protruding pins 675 for registering with corresponding openings in the substrate(s) (not illustrated) which can be configured to provide a tight fit. Furthermore, each distance layer has a receiving opening 677, in this example another through hole, for receiving a pin 635 that protrudes from the top of a corresponding registration element 637. The registration elements 637 can be affixed or integrally shaped with the light guide and are configured to register the optical coupling elements 630 with the substrate. In this example, the registration elements 637 are spaced apart by four optical coupling elements 630 and units of eight optical coupling elements 630 are grouped per single distance layer 670. The luminaire assembly 600 can include eight or another number of such units, for example.

In this example, the registration elements 637 are aligned with holes 649 in the light guide, which are used to couple the light guide with the housing. The holes can be configured to provide a tight or sliding fit (as illustrated in FIGS. 6A and 6B) with the housing (not illustrated).

Each distance layer 670 can extend along one or more substrates. The arrangement of the pins and holes in the distance layer is configured to accommodate differential thermal and/or hygroscopic expansion in a sliding manner as described herein while maintaining proper opto-mechanical registration.

Figure 7:
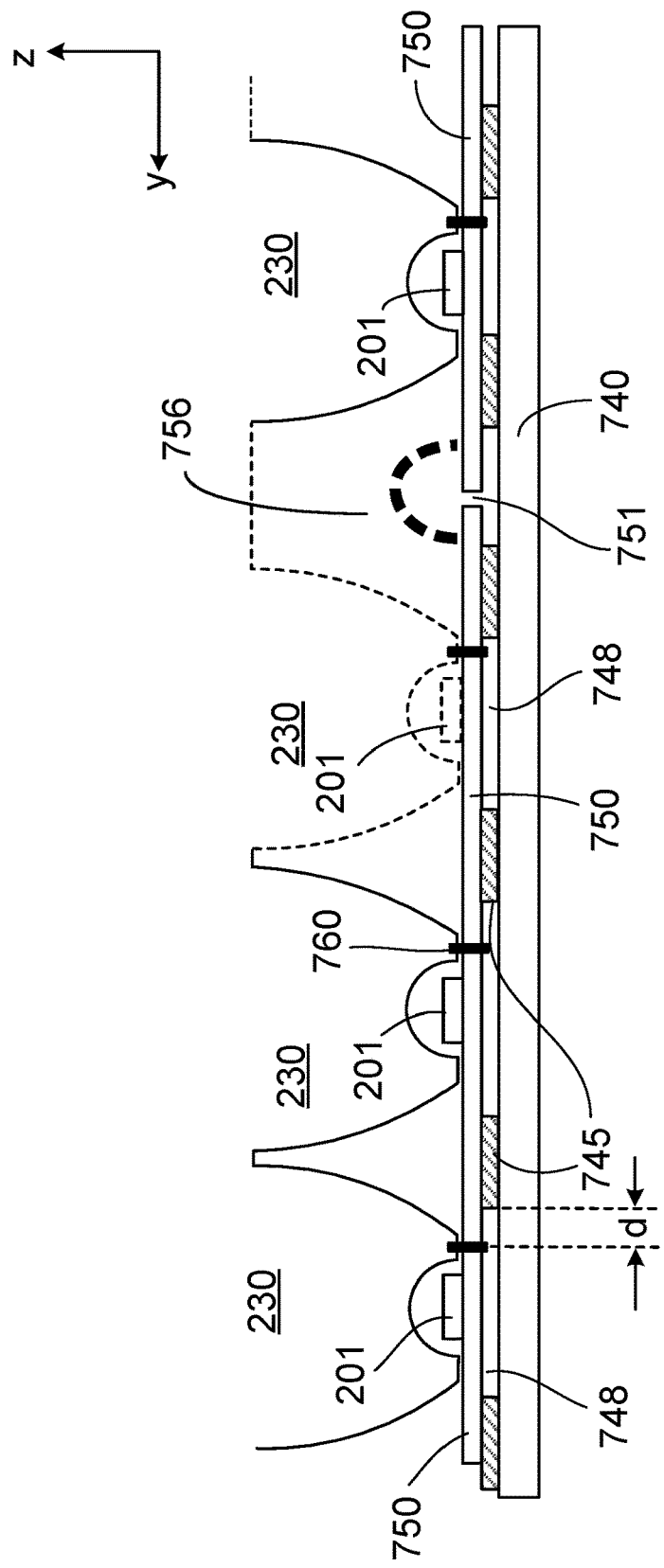
FIG. 7 is a cross-sectional view of components of another embodiment of a luminaire assembly.

Referring to FIG. 7, in some embodiments, a luminaire assembly features a discontinuous heat coupling layer 745 that secures a substrate 750 (e.g., formed from Kapton) to a housing 740. Also shown in FIG. 7 are coupling elements 230 and light emitting elements 201. In this implementation, registration features 760 (e.g., pins) register each optical coupler 230 to substrate 750. In some implementations, only some optical couplers may be registered with the substrate.

Heat coupling layer 745 is composed of discrete portions of a heat coupling material separated by spaces 748. In the y-direction, the spaces 748 are aligned adjacent to the light emitting elements 201 and the locations where the optical couplers 230 are secured to substrate 750. The portions of heat coupling material are located adjacent to gaps between the optical couplers 230, where the edge of the heat coupling material is offset from registration feature 760 by a distance d. In some embodiments, the portion of substrate 750 between registration feature 760 and the edge of the heat coupling material can be a flexible section, such as the flexible portions discussed above in connection with FIG. 4B or 4C.

In some implementations, the luminaire assembly shown in FIG. 7 can be composed of modules of optical couplers 230 mounted on separate substrates. For example, as shown in FIG. 7, two separate modules are illustrated, separated by a space 751. A flexible electrical conductor 756 may be used to electrically connect the conductors on the two substrates. The number of optical couplers 230 per module may be different.

While the foregoing examples feature units of integral optical coupling elements composed of six elements, each separated by a space and a corresponding joint in the substrate and heat coupling layer, in general, joints can be inserted between units composed of fewer or more than six optical coupling elements. In general, the number of joints and their spacing will depend on the amount of thermal expansion the luminaire assembly will experience over the range of temperatures it is likely to experience during its lifetime (e.g., from −20° C. through 80° C.). Generally, there should be sufficient joints in the luminaire to accommodate the expansion without damage to the luminaire. For example, there should be sufficient joints to accommodate expansion without light emitting elements losing registration with their corresponding optical coupling elements. Furthermore, damage to the luminaire assembly, such as separation of other components from each other, or cracking or warping of components, may be mitigated.

While the foregoing embodiments all feature a luminaire assembly that extends in a single direction, in general, the principles disclosed herein may be applied to luminaires having other form factors. For example, the principles may be applied to straight, curved or luminaires having multiple light guides arranged in polygonal structures, such as those described in U.S. Pat. No. 8,506,112 (see, e.g., the embodiments disclosed in FIGS. 14A-C and FIGS. 15A-D therein), the entire contents of which are incorporated herein by reference.

Furthermore, luminaire assemblies can include components in addition to those described in the foregoing embodiments. For example, luminaire assemblies may include additional reflectors for redirecting light exiting the optical element at the output end of the light guide. Here, a housing of a luminaire assembly can be configured to support, on its inner surfaces, a substrate and the light guide of the luminaire assembly and, on its outer surfaces, one or more such additional reflectors, for instance. Exemplary embodiments are described in U.S. Pat. No. 8,506,112 (see, e.g., the embodiments disclosed in FIGS. 6, 8, 11A-B, 12A-B, and 13E therein).

More generally, the principles disclosed herein may be applied to luminaire assemblies in which registration between light emitting elements and other components is necessary for proper functioning of the luminaire assembly. For instance, in certain embodiments, such luminaires may include optical coupling elements but no light guide. Exemplary embodiments are described in U.S. Pat. No. 8,506,112 (see, e.g., the embodiments disclosed in FIGS. 21A-B, 25, 28, and 29A-C therein).

A number of embodiments have been disclosed. Other embodiments are in the following claims.

What is claimed is:

1. A luminaire assembly comprising:
a substrate extending along a first direction and having a first coefficient of thermal expansion in the first direction;
a plurality of light emitting elements (LEEs) secured to the substrate, the light emitting elements being arranged along the first direction;
a light guide having a second coefficient of thermal expansion in the first direction, the second coefficient of thermal expansion different from the first coefficient of thermal expansion over an operating temperature range;
a plurality of optical elements arranged along the first direction, each optical element being positioned to receive light emitted from a corresponding one or more of the light emitting elements and to direct the light to an edge of the light guide;
a housing;
a plurality of fastening features each affixing the light guide to the housing at a corresponding location along the first direction, wherein
one or more of the fastening features are configured to provide a sliding coupling that allows sliding along a portion of the first direction, and
one of the fastening features is configured to provide a tight coupling without mechanical play along the first direction at the corresponding location, wherein the one of the fastening features that provides a tight coupling is arranged between two fastening features providing a sliding coupling; and
a heat coupling layer arranged between the substrate and the housing,
wherein each of the plurality of light emitting elements remains registered with its corresponding optical element over the operating temperature range.

2. The luminaire assembly of claim 1, wherein the substrate comprises multiple separate portions, and the luminaire assembly further comprising a plurality of registration features configured to register the optical elements relative to corresponding separate portions of the substrate at corresponding locations along the first direction, each separate portion of the substrate having one of the registration features arranged between adjacent fastening features and configured to provide a tight coupling with the respective optical elements.

3. The luminaire assembly of claim 1, wherein each fastening feature extends into the housing and into the light guide at the corresponding location.

4. The luminaire assembly of claim 1, wherein each fastening feature comprises a male portion and a female portion shaped to receive the male portion.

5. The luminaire assembly of claim 4, wherein the male portion comprises a fastener affixed to the housing at the corresponding location.

6. The luminaire assembly of claim 4, wherein the housing comprises the male portions of each of the fastening features and the light guide comprises the female portions.

7. The luminaire assembly of claim 1, wherein each fastening feature has an axis arranged perpendicular to the first direction and an axis of the light guide.

8. The luminaire assembly of claim 1, wherein each fastening feature includes a threaded bolt.

9. The luminaire assembly of claim 1, wherein the housing comprises a heat sink.

10. The luminaire assembly of claim 9, wherein the heat coupling layer accommodates differential thermal expansion between the light guide and optical elements and the heat sink over the operating temperature range.

11. The luminaire assembly of claim 1, wherein the light guide and the optical elements are integrally formed.

12. A luminaire assembly comprising:
a substrate extending along a first direction and having a first coefficient of thermal expansion in the first direction;
a plurality of light emitting elements (LEEs) secured to the substrate, the light emitting elements being arranged along the first direction;
a light guide having a second coefficient of thermal expansion in the first direction, the second coefficient of thermal expansion different from the first coefficient of thermal expansion over an operating temperature range;
a plurality of optical elements arranged along the first direction, each optical element being positioned to receive light emitted from a corresponding one or more of the light emitting elements and to direct the light to an edge of the light guide;
a housing; and
a heat coupling layer arranged between the substrate and the housing, wherein the heat coupling layer comprises spaced-apart portions of a heat coupling material,
wherein each of the plurality of light emitting elements remains registered with its corresponding optical element over the operating temperature range.

13. The luminaire assembly of claim 12, wherein discontinuities in the spaced apart portions of the heat coupling material are located at the same location as the light emitting elements in the first direction.

14. The luminaire assembly of claim 13, wherein the spaced apart portions of the heat coupling layer extend continuously in the first direction adjacent to at least two or more light emitting elements.

15. The luminaire assembly of claim 12, wherein discontinuities in the spaced apart portions of the heat coupling material are offset from locations of the light emitting elements in the first direction.

16. The luminaire assembly of claim 12, wherein portions of the substrate between the LEEs are more rigid than portions of the substrate located adjacent to the LEEs.

17. The luminaire assembly of claim 12, wherein the heat coupling layer comprises a layer of a flexible material that extends continuously in the first direction adjacent to multiple light emitting elements.

18. The luminaire assembly of claim 12, wherein the heat coupling layer adheres the substrate to the housing.

19. The luminaire assembly of claim 18, wherein the heat coupling layer comprises a silicone foam.

20. The luminaire assembly of claim 18, wherein the heat coupling layer comprises a thermal paste.

21. The luminaire assembly of claim 18, wherein the heat coupling layer comprises a thermal adhesive tape.

22. The luminaire assembly of claim 12, wherein the light guide and the optical elements are integrally formed.

23. A luminaire assembly comprising:
a substrate extending along a first direction and having a first coefficient of thermal expansion in the first direction;

a plurality of light emitting elements (LEEs) secured to the substrate, the light emitting elements being arranged along the first direction;
a light guide having a second coefficient of thermal expansion in the first direction, the second coefficient of thermal expansion different from the first coefficient of thermal expansion over an operating temperature range;
a plurality of optical elements arranged along the first direction, each optical element being positioned to receive light emitted from a corresponding one or more of the light emitting elements and to direct the light to an edge of the light guide;
a plurality of registration features configured to register the optical elements relative to the substrate at corresponding locations along the first direction;
a housing; and
a heat coupling layer arranged between the substrate and the housing,
wherein each of the plurality of light emitting elements remains registered with its corresponding optical element over the operating temperature range.

24. The luminaire assembly of claim 23, wherein the registration features engage the optical elements and the substrate.

25. The luminaire assembly of claim 23 further comprising a distance layer arranged between the optical elements and the substrate, wherein some registration features register the substrate with the distance layer and other registration features register the distance layer with the optical elements.

26. The luminaire assembly of claim 25, wherein the other registration features are arranged along the first direction between the optical elements.

27. The luminaire assembly of claim 25, wherein the other registration features are arranged along the first direction at locations of the optical elements.

28. The luminaire assembly of claim 23, wherein one or more of the registration features are configured to provide a sliding coupling that allows sliding along a portion of the first direction.

29. The luminaire assembly of claim 28, wherein one of the registration features is configured to provide a tight coupling without mechanical play along the first direction at the corresponding location.

30. The luminaire assembly of claim 29, wherein one of the registration features that provides a tight coupling is arranged between two registration features providing a sliding coupling.

31. The luminaire assembly of claim 23, wherein each registration feature extends into the corresponding optical element and into the substrate at the corresponding location.

32. The luminaire assembly of claim 31, wherein each registration feature comprises a male portion and a female portion shaped to receive the male portion.

33. The luminaire assembly of claim 32, wherein the substrate comprises the male portion of each registration feature and optical elements comprise the female portion.

34. The luminaire assembly of claim 23, wherein the registration features are located periodically in the first direction.

35. The luminaire assembly of claim 34, wherein at least two light emitting elements are located between adjacent registration features.

36. The luminaire assembly of claim 23, wherein the light guide and the optical elements are integrally formed.

37. A luminaire assembly comprising:
a substrate extending along a first direction and having a first coefficient of thermal expansion in the first direction;
a plurality of light emitting elements (LEEs) secured to the substrate, the light emitting elements being arranged along the first direction, wherein the substrate comprises one or more joints each located between an adjacent pair of light emitting elements;
a light guide having a second coefficient of thermal expansion in the first direction, the second coefficient of thermal expansion different from the first coefficient of thermal expansion over an operating temperature range;
a plurality of optical elements arranged along the first direction, each optical element being positioned to receive light emitted from a corresponding one or more of the light emitting elements and to direct the light to an edge of the light guide;
a housing; and
a heat coupling layer arranged between the substrate and the housing,
wherein each of the plurality of light emitting elements remains registered with its corresponding optical element over the operating temperature range.

38. The luminaire assembly of claim 37, wherein the substrate comprises a layer of a substrate material and each joint comprises a discontinuity in the layer of the substrate material.

39. The luminaire assembly of claim 37, wherein the substrate comprises a layer of a substrate material and each joint comprises a portion of substrate material having a thickness in at least one dimension that is different from a thickness in that dimension of the substrate material adjacent each light emitting element.

40. The luminaire assembly of claim 37, wherein the substrate comprises a layer of electrically-conducting material, the layer of electrically-conducting material being discontinuous at the joints.

41. The luminaire assembly of claim 40, further comprising portions of flexible electrically-conducting material that electrically couple the layer of the electrically-conducting material on opposing sides of a corresponding joint.

42. The luminaire assembly of claim 41, wherein the joints are sufficiently flexible to accommodate a thermal expansion of the substrate over the operating temperature range.

43. The luminaire assembly of claim 37, wherein the light emitting elements are light-emitting diodes.

44. The luminaire assembly of claim 43, wherein the light-emitting diodes are white light-emitting diodes.

45. The luminaire assembly of claim 37, wherein the substrate comprises a metal core printed circuit board, a glass-epoxy laminate printed circuit board, a ceramic printed circuit board, or a flexible circuit board.

46. The luminaire assembly of claim 37, wherein the housing comprises a material having a high thermal conductivity.

47. The luminaire assembly of claim 46, wherein the material having high thermal conductivity comprises a metal.

48. The luminaire assembly of claim 37, wherein the housing comprises aluminum.

49. The luminaire assembly of claim 37, wherein the luminaire assembly extends about six inches or more in the first direction.

50. The luminaire assembly of claim 37, wherein the luminaire assembly extends about 12 inches or more in the first direction.

51. The luminaire assembly of claim 37, wherein the luminaire assembly extends about 24 inches or more in the first direction.

52. The luminaire assembly of claim 37, wherein the luminaire assembly extends about 48 inches or more in the first direction.

53. The luminaire assembly of claim 37, wherein the substrate comprises a printed circuit board.

54. The luminaire assembly of claim 37, wherein the substrate comprises flexible portions between the LEEs and spaced apart portions of heat transfer material.

55. The luminaire assembly of claim 37, wherein the optical elements each comprises a recess shaped to accommodate the corresponding one or more light emitting elements.

56. The luminaire assembly of claim 55, wherein the one or more light emitting elements are optically coupled to the corresponding optical element by an optical coupling medium in the recess.

57. The luminaire assembly of claim 55, further comprising a layer comprising a wavelength conversion material disposed on a surface of the optical element in the recess.

58. The luminaire assembly of claim 57, wherein the wavelength conversion material comprises a phosphor.

59. The luminaire assembly of claim 55, wherein an air gap exists in the recess between the optical element and the corresponding one or more light emitting elements.

60. The luminaire assembly of claim 37, wherein the light guide and the optical elements are integrally formed.

* * * * *